(12) United States Patent
Fuller et al.

(10) Patent No.: US 12,509,298 B1
(45) Date of Patent: Dec. 30, 2025

(54) END OF ARM TOOLS HAVING CONVEYANCE SURFACES

(71) Applicant: Amazon Technologies, Inc., Seattle, WA (US)

(72) Inventors: Christine Leonore Fuller, Mountain View, CA (US); Curt Salisbury, Seattle, WA (US); Benjamin Bedard, Revere, MA (US); Matthew Aaron Frost, Pasadena, CA (US)

(73) Assignee: Amazon Technologies, Inc., Seattle, WA (US)

( * ) Notice: Subject to any disclaimer, the term of this patent is extended or adjusted under 35 U.S.C. 154(b) by 486 days.

(21) Appl. No.: 18/178,863

(22) Filed: Mar. 6, 2023

(51) Int. Cl.
 *B65G 1/137* (2006.01)
 *B25J 9/16* (2006.01)
 *B65G 47/90* (2006.01)

(52) U.S. Cl.
 CPC ............ *B65G 1/137* (2013.01); *B25J 9/1612* (2013.01); *B25J 9/1694* (2013.01); *B65G 47/902* (2013.01)

(58) Field of Classification Search
 CPC ...... B65G 1/137; B65G 47/902; B25J 9/1612; B25J 9/1694
 See application file for complete search history.

(56) References Cited

U.S. PATENT DOCUMENTS

| | | | | |
|---|---|---|---|---|
| 8,602,473 B2 * | 12/2013 | Weber | .................. | B25J 15/0266 294/207 |
| 11,492,210 B2 * | 11/2022 | Wagner | .................. | B65G 47/49 |
| 12,122,618 B1 * | 10/2024 | Ruffatto | ................. | B65G 47/34 |
| 2006/0182603 A1 * | 8/2006 | Hawes | ................. | B25J 15/0253 414/735 |
| 2009/0104010 A1 * | 4/2009 | Binder | ................... | B65G 47/90 414/662 |
| 2011/0000082 A1 * | 1/2011 | Yamashita | ............... | B23Q 7/04 29/791 |
| 2016/0167227 A1 * | 6/2016 | Wellman | .................. | B65G 1/10 901/3 |
| 2016/0199884 A1 * | 7/2016 | Lykkegaard | ....... | G05B 19/4182 700/223 |
| 2018/0273296 A1 * | 9/2018 | Wagner | ................... | B65G 47/82 |
| 2024/0317435 A1 * | 9/2024 | Wagner | ................... | B65B 35/36 |

* cited by examiner

*Primary Examiner* — Michael Collins
(74) *Attorney, Agent, or Firm* — Eversheds Sutherland (US) LLP

(57) ABSTRACT

Systems, methods, and computer-readable media are disclosed for end of arm tools having conveyance surfaces and related item manipulation devices. In one embodiment, an example item manipulation device may include a first conveyor assembly having a first conveyance surface configured to actuate in a first direction, a second conveyor assembly having a second conveyance surface that opposes the first conveyance surface, the second conveyance surface configured to actuate in the first direction, where the item manipulation device may grasp an item between the first conveyor assembly and the second conveyor assembly, and a controller configured to cause the item to be grasped between the first conveyor assembly and the second conveyor assembly, and actuate the first conveyor assembly and the second conveyor assembly to unload the item from the item manipulation device.

20 Claims, 10 Drawing Sheets

END OF ARM TOOLS HAVING CONVEYANCE SURFACES

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. Accordingly, improvements in various operations of order fulfillment, such as improvements to picking technology, sorting technology, packing technology, and so forth may be desired, such that manual efforts can be redirected to different tasks.

Figure 1:
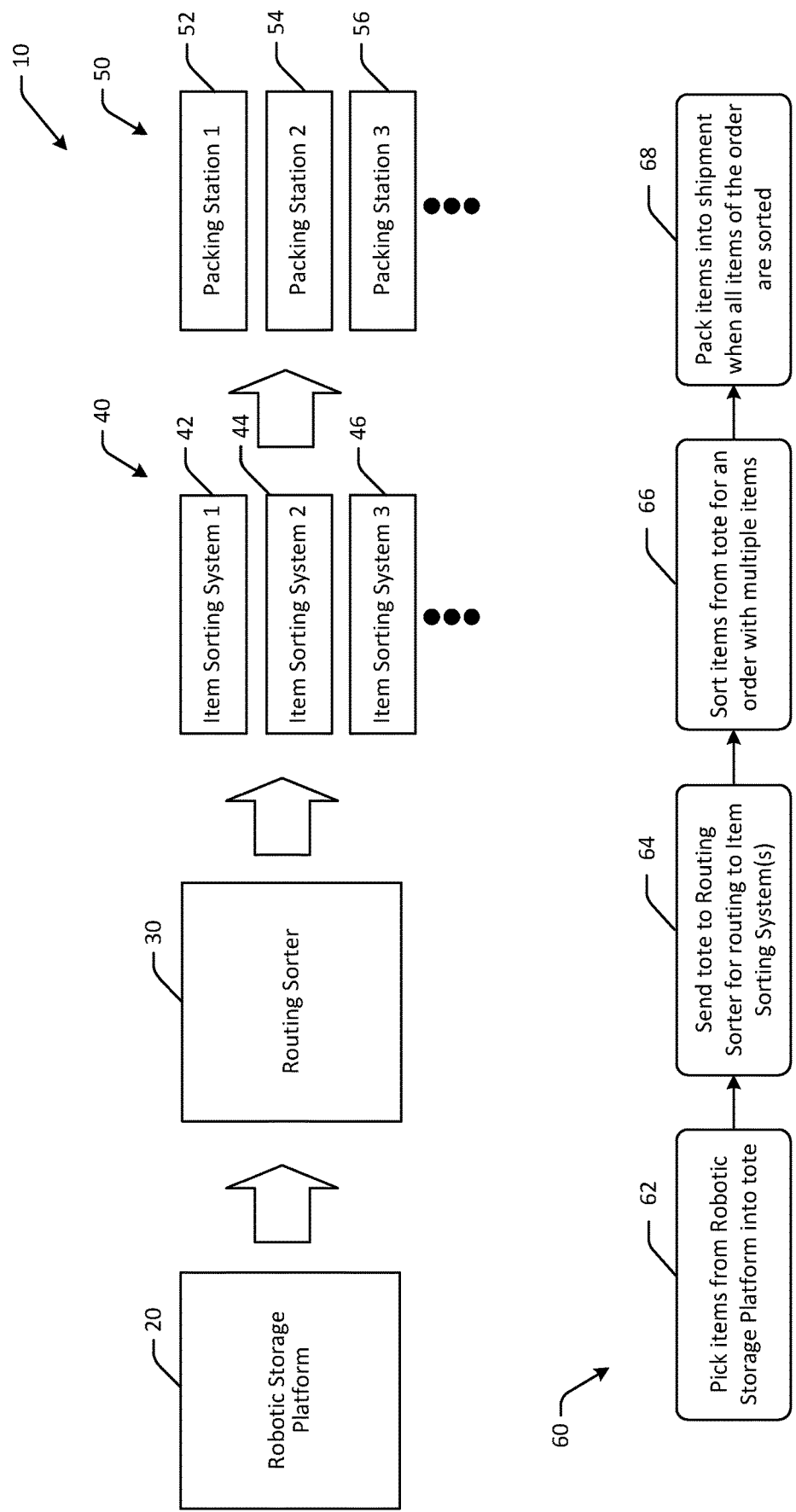
FIG. 1 is a hybrid schematic illustration of an example use case for end of arm tools having conveyance surfaces and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

Moving items or objects through a fulfillment center may require handling of the item itself. For example, picking the item from inventory, placing the item into a container, removing the item from a container, and so forth may all be examples of actions for which an item may need to be handled. In addition, different items may have different types of packaging. For example, some items may come in boxes, some items may come in loose bags, some items may come shrink wrapped, some items may not have any packaging, and so forth. In addition, retrieving a certain number of items, such as singular items, or multiple items in cluttered environments (e.g., stacked on top of each other or otherwise in a number of layers, etc.), may be difficult, and may depend on a type of packaging in which the item comes with. Humans may be able to manually handle individual items with ease. However, robotic handling of items may require various levels of dexterity. Similarly, placing items into storage areas, such as into storage pods or other containers that include one or more items inside may be difficult as well. For example, creating space inside a storage area and then depositing an item may be an easy manual task, but may be difficult to accomplish via robotic handling due to the number of item dimensions, shapes, packaging materials, changes in center of gravity, and so forth.

Embodiments of the disclosure include methods and systems for end of arm tools having conveyance surfaces. The end of arm tools may be configured to handle many different types of items and create space inside storage areas. Such end of arm tools may have improved control over items, reduce a likelihood of item damage, and provide smoother unloading or ejection of items. Some embodiments may be configured to use an extendable blade to create space for the item, and ejects the item into that space. Embodiments may include two parallel paddles to grasp items, which may eliminate damage modes observed when using suction-based end of arm tools. Each paddle may have a conveyor that matches a rate of an infeed conveyor to smoothly transition an item from a buffer area into the end of arm tool. The paddles then close to grasp the item. To consolidate empty volume at a target storage location, the end of arm tool can include an extendable blade that, for example, sweeps items to one side. During item ejection, conveyors on the paddles run in reverse. The conveyor speed of the paddles is matched to ensure equal force is applied to both sides of the item. The conveyor paddles also ensure static friction is always maintained between the gripper and the item. Some embodiments include optimized process flows for processing of orders at fulfillment centers, as well as process flows or methods to increase speed of transporting items as a result of improved item handling. As a result, throughput of fulfillment centers may be improved, and/or logistics of fulfillment center operations may be less complicated.

Referring to FIG. 1, an example use case 10 for end of arm tools having conveyance surfaces and an example process flow in accordance with one or more embodiments of the disclosure. Although discussed in the context of online orders, other embodiments may be directed to any suitable use case where products or containers are picked and sorted, or packages are sorted, such as instances where users may pick up orders rather than receiving a shipment, instances where items are aggregated for transport to another fulfillment center, and so forth.

In FIG. 1, a fulfillment center may include a robotic storage platform 20, a routing sorter 30, one or more item sorting systems 40, and one or more packing stations 50. The robotic storage platform 20 may be a portion of the fulfillment center at which products picked from product inventory are placed. Inventory may be stored in containers in flexible container pods in some instances. Robots may be used with end of arm tools described herein to place items into inventory pods and/or to pick products from inventory and to deliver to the robotic storage platform in some instances, while in other instances, manual effort or a combination thereof may be used to pick products. The picking process at the robotic storage platform may include locating a product in an order, obtaining the product, and sending the product to the robotic storage platform 20, such as via a conveyor belt. In the illustrated embodiment, products at the robotic storage platform 20 may be placed in a container, such as a tote. The tote may optionally be assigned to, or otherwise associated with, a particular item sorting system machine in some instances. For example, a certain tote may be associated with a certain item sorting system, such that products that are designated to be picked and placed in the tote are for orders that are to be consolidated at that particular item sorting system. The association between the tote and the item sorting system may be static in some instances. In other embodiments, there may not be any association between totes and item sorting systems, or associations may be dynamic.

At the routing sorter 30, totes including products that have been picked may be routed to the appropriate or designated item sorting system. For example, the routing sorter 30 may optionally determine an identifier associated with the tote, and may determine one or more item sorting systems to which the tote is to be routed using the identifier or using another factor, such as sortation system load. The routing sorter 30 may route or direct the tote to an item sorting system.

The item sorting systems 40 may include one or more item sorting system machines. In FIG. 1, a first item sorting system 42, a second item sorting system 44, a third item sorting system 46, and so forth may be included. Any number of item sorting systems may be included. Some or all of the item sorting systems may optionally be associated with certain totes. The item sorting systems may be used to consolidate or otherwise aggregate products for single or multi-item orders and/or for transfer to a different fulfillment center. For example, a first tote may include a first item of a multi-item order, and a second tote may include a second item of the multi-item order. The item sorting system may therefore identify the orders associated with the respective products in a tote, and may transport the products to a container, such as a tote, a flexible container, a specific chute leading to a container, or a different container associated with the order. When the order is complete with all of the products in the associated chute or container, the order may be packed. In instances where a container is designated for a different fulfillment center, as opposed to an online order, the container may be packed when full, as opposed to when certain items are placed into the container (e.g., there may not be any specific items that need to be in the container before packing, rather, the container may just be a certain threshold full, etc.). Accordingly, a specific item sorting system may be designated for fulfillment of a particular multi-item order. As a result, all of the products in the multi-item order may be placed in totes that are directed to that particular item sorting system. At the item sorting systems 40, totes that are received via the routing sorter 30 may be emptied, and the products in the respective totes may be transported to the appropriate chutes or containers for the orders for which the products were picked.

After a single or multi-item order is complete (e.g., the item sorting system has delivered all of the products in the order to the appropriate chute, container, etc.), or when a container designated for another fulfillment center is full (where full is a configurable threshold, such as about 60% full capacity, 70% full capacity, 80% full capacity, 90% full capacity, etc.), the order may be packed at the packing station 50. In some embodiments, one or more packing stations may be included. In some instances, a packing station may service more than one item sorting system, while in other instances, more than one packing station may service one item sorting system. In the illustration of FIG. 1, a first packing station 52 may be used to pack orders from the first item sorting system 42, a second packing station 54 may be used to pack orders from the second item sorting system 44, a third packing station 56 may be used to pack orders from the third item sorting system 46, and so forth. At the packing stations 50, the orders may be placed into boxes and sealed for subsequent shipment. The packages may then be processed for shipment to the user. In another example, the containers may be stacked, closed, or otherwise packed for shipment to another fulfillment center.

At the fulfillment center, an example process flow 60 illustrated in FIG. 1 may be implemented to improve the efficiency and/or throughput of the fulfillment center. At a first block 62, items may be picked from the robotic storage platform 20 into a tote that may optionally be associated with a specific item sorting system. At a second block 64, the tote may be sent to the routing sorter 30 for routing to an item sorting system. At a third block 66, the items from the tote may be sorted for an order with multiple item by the specific item sorting system. At a fourth block 68, the items may be packed into a shipment when all of the items in the order are sorted.

Embodiments of the disclosure include end of arm tools having conveyance surfaces that are configured to handle items for placement into target locations, such as storage areas. Certain embodiments may improve processing speed and/or throughput of fulfillment centers. Certain embodiments may improve performance of mechanical equipment for sortation and/or consolidation of items. While described in the context of online orders, aspects of this disclosure are more broadly applicable to other forms of object handling.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
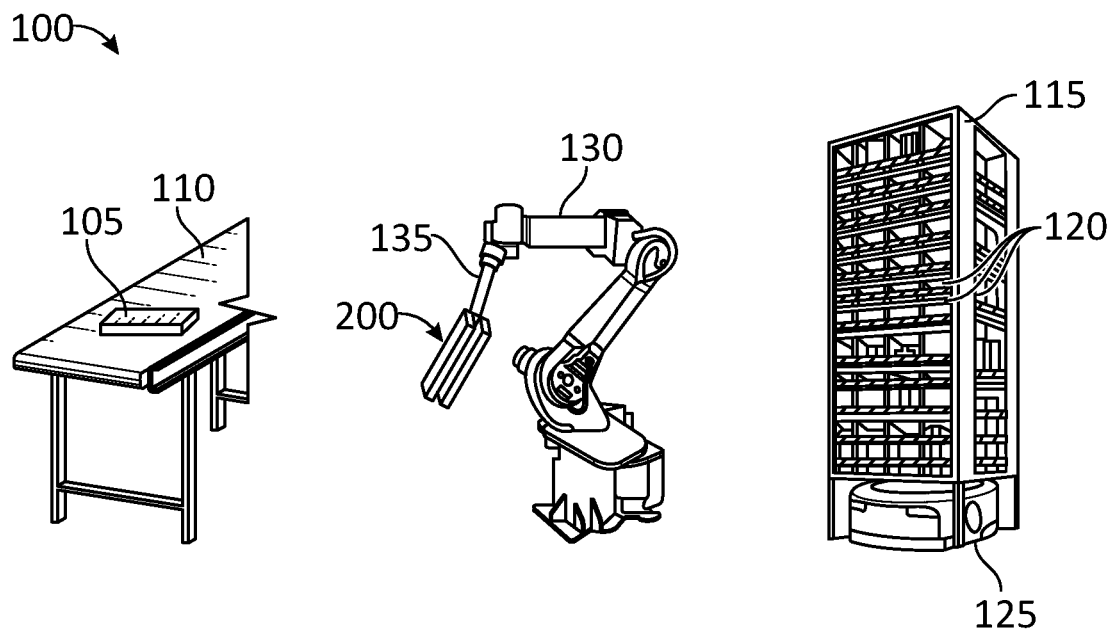
FIG. 2 is a schematic illustration of an example item management system for moving and storing items in accordance with one or more embodiments of the disclosure.
Figure 2:
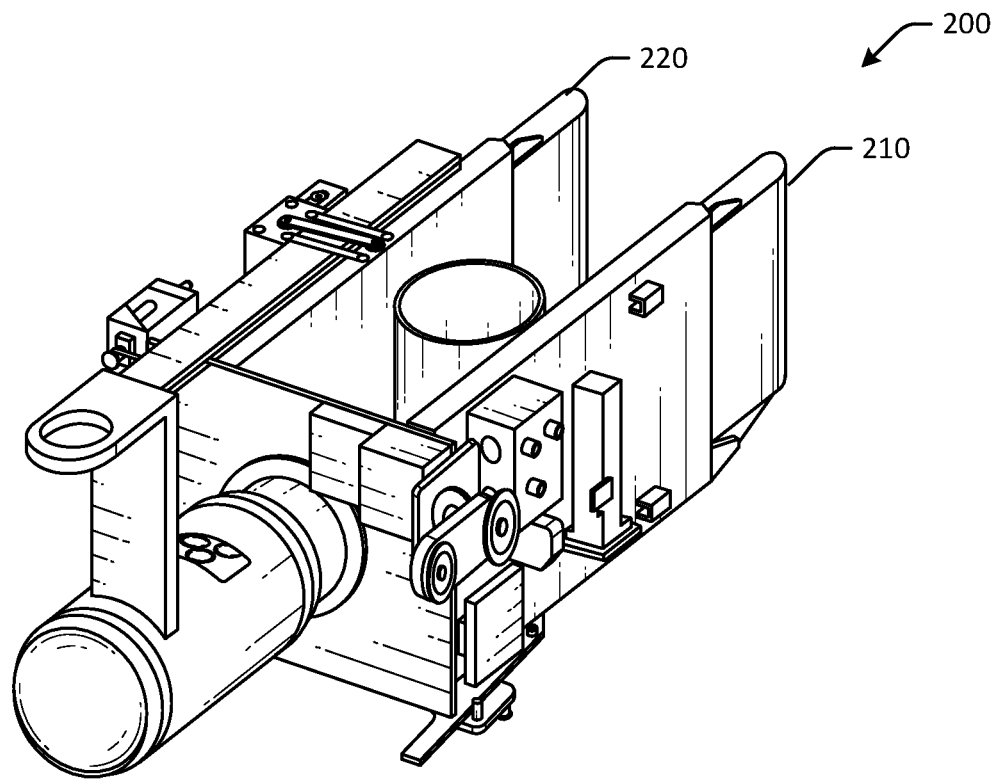

FIG. 2 is a schematic illustration of an example item management system for moving and storing items in accordance with one or more embodiments of the disclosure. Other embodiments may include additional or fewer components. The illustration of FIG. 2 may not be to scale, and may not be illustrated to scale with respect to other figures. The robotic manipulator and end of arm tool configured to grasp items illustrated in FIG. 2 may be used throughout the fulfillment center environment discussed with respect to FIG. 1.

Inventory systems are utilized by many entities for storing and managing inventory. For example, some retailers may utilize a warehouse of racks that store items in various containers (also referred to as bins, storage locations, etc.). Items may be stowed in the various containers to hold the item in preparation for picking. For example, when an order for a specific item needs to be fulfilled by a retailer, the item can be picked (or retrieved) from the container where the item is stored. Inventory systems according to one embodiment described herein use a mechanical system to stow an item into a container and/or pick an item from the container. In one embodiment, the mechanical system includes a robotic arm that permits various sensors and end of arm tools (also referred to herein as end effectors) to interact with items outside and/or within multiple containers. For example, the multiple containers may be supported by a rack (also referred to as an inventory holder or a rack of shelves) where each container may have any number of items. The robotic arm can use the end of arm tool to grasp an item located outside of the container (e.g., in a holding area), transport the item to a particular container, and stow the item into the container.

In some instances, the robotic arm uses an end of arm tool that can manipulate existing items within a densely packed container in order to create space for stowing an additional item. In one particular embodiment, the end of arm tool includes two paddleboards having conveyance surfaces configured to interact with an item. The end of arm tool can grasp an item by engaging (e.g., squeezing) the item between the two paddleboards or providing a support surface underneath the item to support the weight of the item, while using the paddleboards to maintain the item's orientation.

After grasping an item with the end of arm tool, the robotic arm can insert the end of arm tool along with the grasped item into an unoccupied space of a particular container, open the plates apart to a point where the grasp is no longer maintained, and retract the end of arm tool from the container, leaving the stowed item in place. In embodiments described in more detail below, the end of arm tool can use a bin blade to also manipulate existing items within a container in order to create enough space to stow a grasped (new) item.

By using paddles of an end of arm tool to engage an item between the paddles (e.g., as opposed to conventional finger or suction-based solutions), embodiments provide a high level of item orientation control and known contact surfaces, which enables high density stowing of items in the desired orientation for a robotic stowing operation. Note that many of the embodiments herein describe an end of arm tool for a robotic arm in the context of stowing an item. In other embodiments, the end of arm tool described herein can be used for other operations, such as picking an item from a container. For example, in these embodiments, the end of arm tool can use the two paddles to manipulate existing items within the container in order to grasp a particular item from within the container. Further, as used herein, an "item" may refer to an individual item, multiple items, a package containing an individual item, a package containing multiple items, etc.

In FIG. 2, a stow or pick system 100 is depicted according to one embodiment. The system 100 may be located in a facility (e.g., warehouse, factory, distribution center, etc.). In one particular embodiment, the system 100 is a robotic stowing or picking system. The system 100 can be located in a fulfillment center that performs various operations in order to ship items to customers. Here, the system 100 includes a rack 115 (also referred to as an inventory holder) that includes multiple containers 120 and a robot 125 that can pick up and move the rack 115 to a particular (or desired) location. The system 100 also includes a robotic arm 130 that can access the containers 120 on the rack, e.g., for a robotic stowing or picking operation. The rack 115 can have containers on multiple sides which can be accessed via the robot 125 spinning the rack 115 so that each side of the rack 115 can face the robotic arm 130 or a different robotic arm(s) (not shown). In one embodiment, the robot 125 can move the rack 115 to a position proximate to the robotic arm 130, e.g., to enable the robotic arm 130 to stow items into (or pick items from) the containers 120. In another embodiment, the robotic arm 130 may be mobile and the racks 115 can be stationary. In this case, the robotic arm 130 may move between the racks to perform stow and pick operations.

In the depicted embodiment, the robotic arm 130 includes a mount 135, which can support various sensors and end of arm tools for stowing and/or picking items from the containers 120. Here, for example, the mount 135 supports an end of arm tool 200, which includes two paddles 210, 220 for grasping, transporting, and stowing items into a particular container. As noted, the end of arm tool 200 can grasp an item 105 located in a holding area 110 (also referred to as an item holding location) with the two paddles 210, 220 by squeezing the item between the two paddles 210, 220. The holding area 110 is representative of a variety of surfaces and can have any form factor suitable for holding items (e.g., table, floor, conveyor belt, etc.). In one embodiment, the holding area 110 includes a flat surface where one or more items 105 are located. In one embodiment, the holding area 110 can include a layer of material disposed on a surface of the holding area 110. This layer of material can aid the end of arm tool 200 in retrieving an item 105 disposed on the layer. The material can include, for example, fabric, foam, plastic, etc.

One or more sensors may be included. The sensor(s) may be a visual sensor, depth sensor, infrared sensor, barcode reader, force sensing sensor, pressure sensor, gyroscope, accelerometer, or combinations thereof. The sensor(s) can be any sensor that permits the system 100 to identify occupied versus empty space in the container, identify the arrangement of items in the container, identify the type or number of items in the container, determine an amount of (squeeze) force applied to an item, determine an orientation of the end of arm tool 200, identify the individual items in the container, and the like. The sensor(s) can be disposed in different locations on the robotic arm 130 and/or end of arm tool 200. For example, the sensor(s) can be mounted to one or more of the paddles 210, 220 of the end of arm tool 200 to allow the end of arm tool 200 to determine the amount of force applied to an item when squeezing the item between the two plates. Similarly, the sensor(s) can allow the end of arm tool 200 to determine how much to separate the paddles 210, 220 of the end of arm tool 200, when stowing the item into the container.

Figure 3:
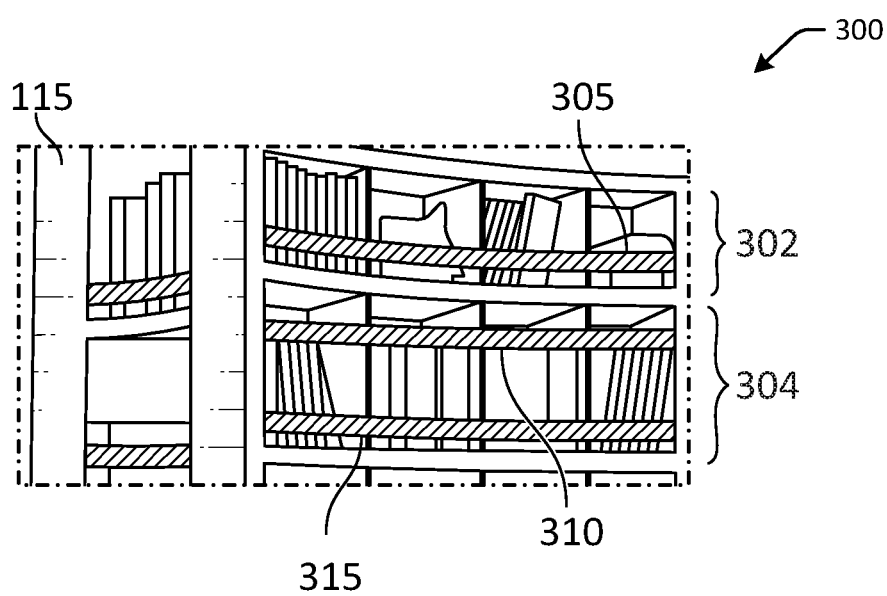
FIG. 3 is a schematic illustration of a stowage pod accessible using an end of arm tool in accordance with one or more embodiments of the disclosure.
Figure 3:
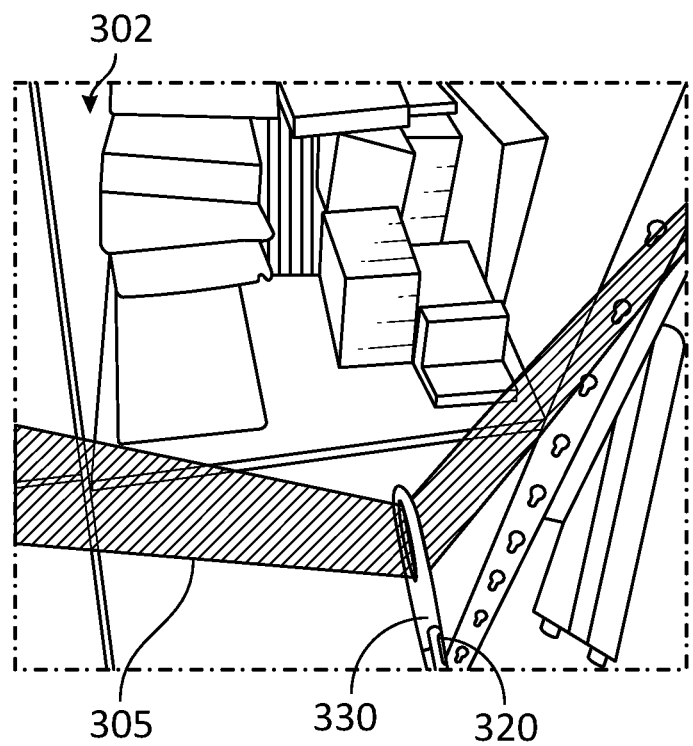

FIG. 3 is a schematic illustration of a stowage pod 300 accessible using an end of arm tool in accordance with one or more embodiments of the disclosure. Other embodiments may include additional or fewer components. The illustration of FIG. 3 is not to scale, and may not be illustrated to scale with respect to other figures. The container transporter illustrated in FIG. 3 may be the same container transporters discussed with respect to FIGS. 1-2.

In FIG. 3, containers 302 and 304 with items being secured by retaining elements 305, 310, and 315 are depicted, according to one embodiment. As shown, FIG. 3 illustrates a portion of a rack that has two rows of containers. The upper row of containers 302 contain a retaining element 305 disposed at the lower half of the open face of the containers 302. In this example, the retaining element 305 is an elastic material that secures the items into the container. If the rack 115 is jostled or accelerated, an item that falls toward the open face of the container is held in the container by the retaining element 305. While the retaining element 305 is elastic, the element 305 has sufficient rigidity to prevent lighter items from falling out of the container but has sufficient elasticity so that an associate or access tool can displace the retaining element 305 to pick or stow an item. The lower row of containers 304 have two retaining elements 310, 315 disposed at their open face. That is, the retaining element 310 is disposed in the lower half of the open face while the retaining element 315 is disposed in the upper half of the open face. Having two retaining elements may be preferred when the items stowed in the containers 304 may be taller or heavier than the items stowed in the containers 302. While FIG. 3 illustrates elastic bands as the retaining elements, in other embodiments, the retaining elements can be a flap that is hinged at the top of the containers, or a gate that swings open and has a magnetic or mechanical clasp to hold the gate closed. Thus, the embodiments herein are not limited to the flexible bands illustrated in FIG. 3 or in the discussion that follows. If a different type of retaining element is used, the access tool may be changed accordingly in order to displace the retaining element so that a grabber tool (or associate) can access the container.

The robotic manipulator and/or end of arm tools described herein may include an access tool 320 for displacing a retaining element to provide access to a container, according to one embodiment. In this example, the access tool 320 has a hook 330 or a clasp for grabbing the retaining element 305. The access tool 320 can then pull the hook 330 downward so that the retaining element 305 no longer covers the open face of the container 302. That way, a grabber tool now has more room to maneuver when performing a stow or pick operation. In another embodiment, the access tool 320 may use forceps to grab the elastic retaining element 305 and pull it down from blocking the open face of the container 302.

FIGS. 4A-4D are schematic illustrations of an end of arm tool 400 having conveyance surfaces and a sample process flow in accordance with one or more embodiments of the disclosure. Other embodiments may include additional or fewer components. The illustrations of FIGS. 4A-4D are not to scale, and may not be illustrated to scale with respect to other figures. The end of arm tool illustrated in FIGS. 4A-4D may be the end of arm tool discussed with respect to FIGS. 1-3.

Figure 4A:
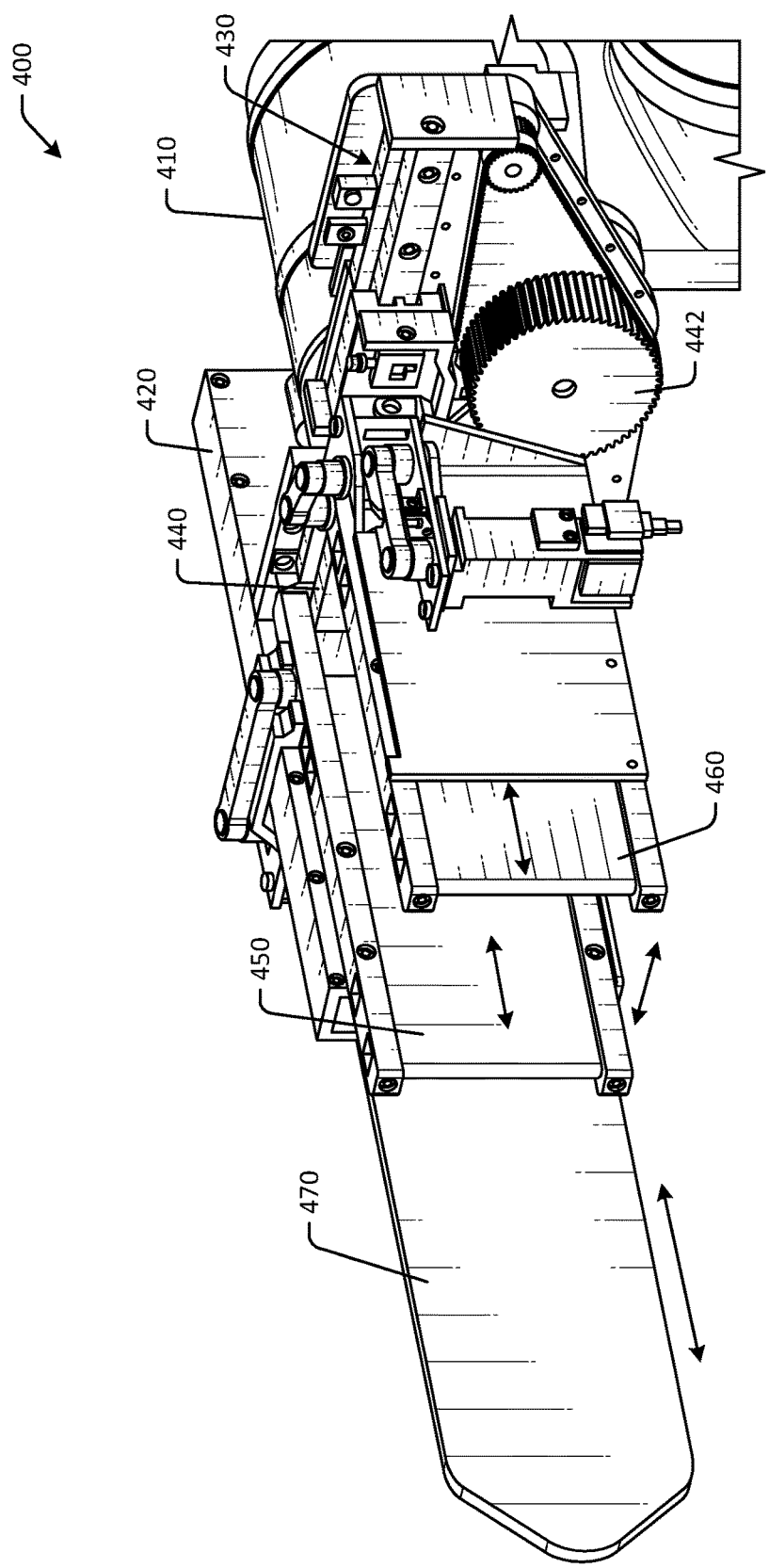
FIGS. 4A-4D are schematic illustrations of an end of arm tool having conveyance surfaces and a sample process flow in accordance with one or more embodiments of the disclosure.
Figure 4B:
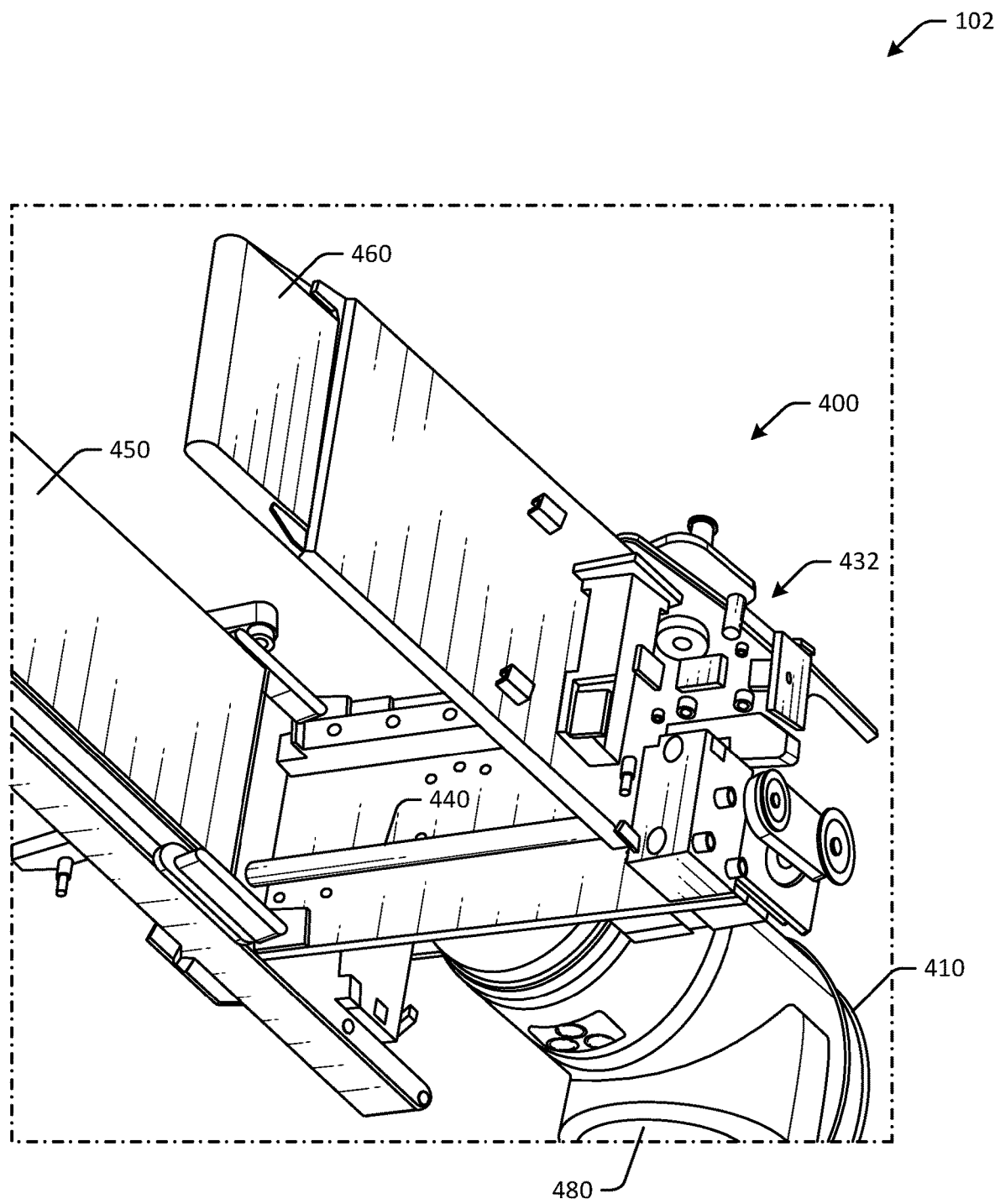

In FIG. 4A, the end of arm tool 400 may be an item manipulation device that is configured to retrieve, grasp and/or secure, move, and unload items of varying sizes and shapes, ranging from t-shirts (e.g., floppy items, etc.) to basketballs (e.g., round or cylindrical items, etc.) to boxed items (e.g., rigid items, etc.). The end of arm tool 400 may be coupled to a robotic manipulator 480, such as a robotic arm, a gantry, or other type of manipulator. The end of arm tool 400 may have six degrees of freedom relative to the robotic manipulator in some embodiments. In other embodiments, the end of arm tool 400 may have at least four degrees of freedom relative to the robotic manipulator. The end of arm tool 400 may be configured to rotate 360 degrees relative to an attachment point to the robotic manipulator, such that an item grasped by the end of arm tool 400 can be rotated to an inverted position and then back to an upright position. The end of arm tool 400 itself may be configured to rotate at least 90 degrees, such that a bin blade can be extended in a horizontal position and a vertical position, and such that items can be loaded and/or unloaded in a horizontal position or a vertical position. In some embodiments, the end of arm tool 400 may be coupled to the robotic manipulator via a quick-connect attachment. The end of arm tool 400 may include a base 410 about which the end of arm tool 400 can rotate 360 degrees.

The end of arm tool 400 may include paddleboard-style conveyors that form opposing grip surfaces to retain an item therebetween. The respective conveyors may be used to unload or eject items from the end of arm tool 400 while maintaining control over the item, and avoiding item damage. In addition, the end of arm tool 400 may include a bin blade 470 that can be used to create space for the item in a stowage pod or other container prior to unloading the item. For example, the bin blade 470 may be extended into the pod and then moved laterally and/or rotated (e.g., to flip up a leaning book, etc.), after which the item may be unloaded from the end of arm tool 400.

In an embodiment, the end of arm tool 400 may have a frame 420. A first conveyor assembly 450 may be coupled to the frame 420. The first conveyor assembly 450 may have a first conveyance surface that is configured to actuate in a first direction and an optional second direction (e.g., forward and reverse, as indicated by arrows in FIG. 4A, etc.). In some embodiments, the conveyance surface may be unidirectional, and in other embodiments the conveyance surface may be bidirectional. The conveyance surface may be any suitable type of conveyor, such as one or more conveyor belts, one or more drive rollers, one or more passive rollers, and/or another type of conveyor.

A second conveyor assembly 460 may be coupled to the frame 420. The second conveyor assembly 460 may have a second conveyance surface that is configured to actuate in a first direction and an optional second direction (e.g., forward and reverse, as indicated by arrows in FIG. 4A, etc.). In some embodiments, the conveyance surface may be unidirectional, and in other embodiments the conveyance surface may be bidirectional. The conveyance surface may be any suitable type of conveyor, such as one or more conveyor belts, one or more drive rollers, one or more passive rollers, and/or another type of conveyor.

The second conveyor assembly 460 may be positioned such that the second conveyance surface opposes the first conveyance surface, where actuation of the first conveyance surface and the second conveyance surface causes an item disposed between to be ejected or unloaded from the end of arm tool 400. The end of arm tool 400 may therefore be configured to grasp an item between the first conveyor assembly 450 and the second conveyor assembly 470, and the respective conveyors may be actuated to load an item between the conveyance surfaces and/or to unload an item grasped between the conveyance surfaces.

The second conveyor assembly 460 may be configured to move or slide with respect to the first conveyor assembly 450, and/or the first conveyor assembly 450 may be configured to move or slide with respect to the second conveyor assembly 460. In some embodiments, both the first conveyor assembly 450 and the second conveyor assembly 460 may be configured to move or slide with respect to each other. In this manner, a distance or gap between the first conveyor assembly 450 and the second conveyor assembly 460 may be adjusted, so as to accommodate different sizes and/or shapes of items to be grasped, as well as to adjust a grip strength applied to the item grasped by the end of arm tool 400. In FIG. 4A, a first belt-driven mechanism 430 with a gear 442 can be used to adjust the distance between the respective conveyor assemblies. Other mechanisms may be used, such as an actuator assembly 432 as depicted in the example embodiment of FIG. 4B, including pneumatic actuators, hydraulic actuators, and so forth.

As an item is grasped by the end of arm tool 400, one or more sensors 440 can be disposed at a distal or rear end of the grasping space to detect when an item is disposed at a rearmost portion of the end of arm tool, which may be used to indicate a fully grasped item. Other signals, such as force sensor feedback indicative of force applied to an item between the conveyor assemblies, distance indicators between the respective conveyor assemblies (as determined by jaw position and/or location sensors, etc.), and/or other signals, can be used to determine whether an item is grasped by the end of arm tool 400. Accordingly, additional sensors, such as proximity sensors, position sensors, force sensors, etc. may be coupled to the end of arm tool 400.

Figure 4C:
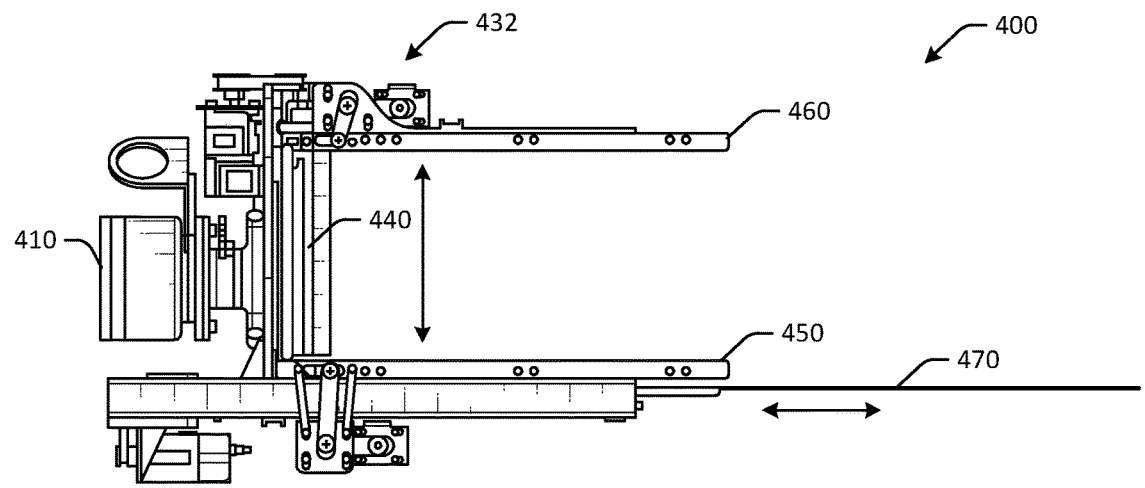
Figure 4C:
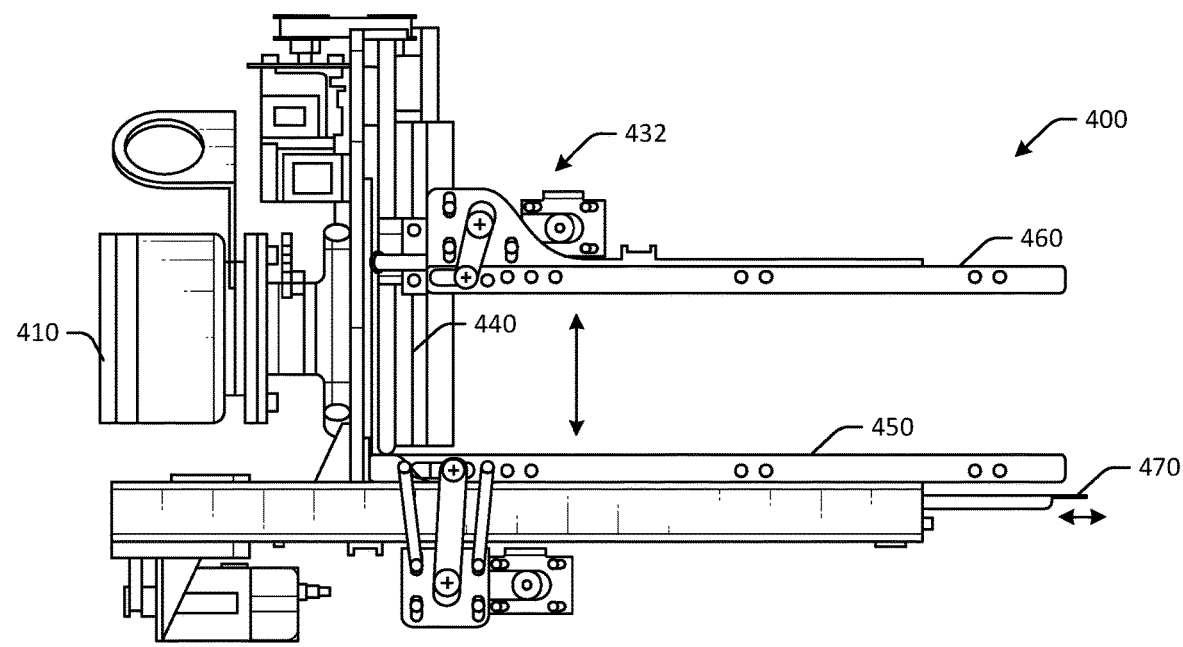

As depicted in FIG. 4C, the second conveyor assembly 460 may be actuated to move relative to the first conveyor assembly 450 to adjust a gap between the respective conveyor assemblies. For example, the distance may be reduced as depicted in FIG. 4C by actuating the second conveyor assembly 460 toward the first conveyor assembly 450. For example, the end of arm tool 400 may include a first actuator configured to cause the second conveyor assembly to move towards the first conveyor assembly and/or optionally to cause the first conveyor assembly to move towards the second conveyor assembly.

The bin blade 470 may be actuated to extend from the end of arm tool 400 to an extended position to create space in a bin or other container for an item to be deposited. For example, the bin blade 470 may be used to part or separate items, after which the item grasped by the end of arm tool 400 can be unloaded. The bin blade 470 may be disposed adjacent to the first conveyor assembly 450 in some embodiments, or may be disposed adjacent to the second conveyor assembly 460 in other embodiments. Some embodiments may include two or more bin blades, such as bin blades disposed adjacent to both conveyor assemblies, bin blades disposed along upper and/or lower portions of the end of arm tool 400 (e.g., extending between the conveyor assemblies transverse to the conveyance surfaces, etc.).

In one embodiment, the end of arm tool 400 may include a first bin blade disposed adjacent to the first conveyor assembly, the first bin blade configured to move from a retracted position to an extended position relative to the first conveyor assembly. The end of arm tool 400 may include an optional second bin blade disposed adjacent to the second conveyor assembly, the second bin blade configured to move from the retracted position to the extended position relative to the second conveyor assembly.

Figure 4D:
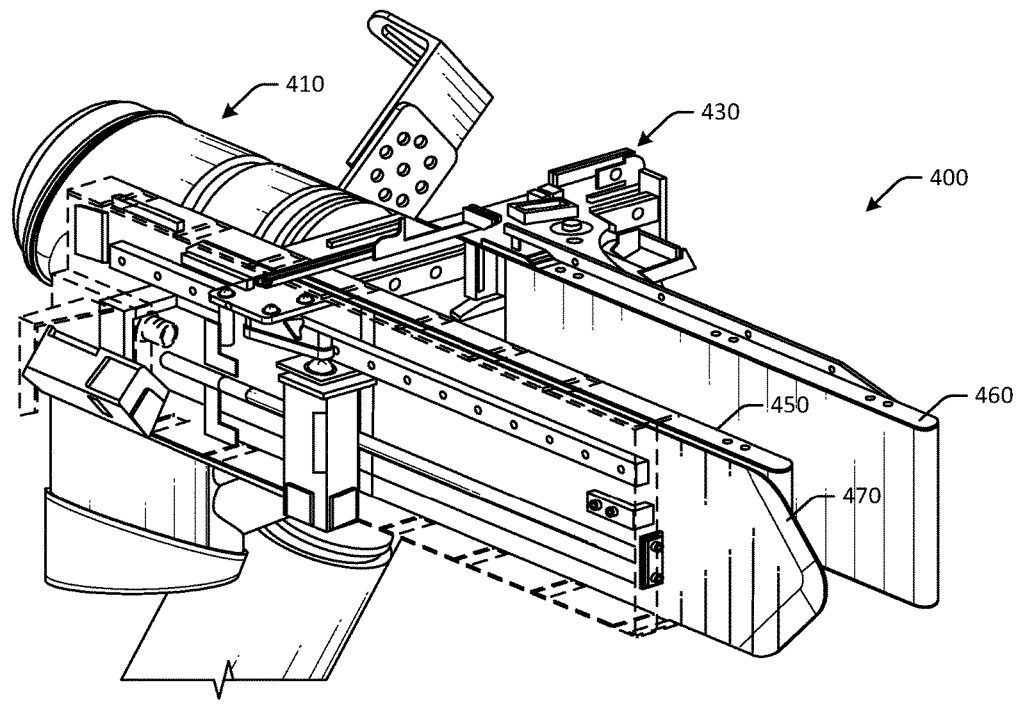
Figure 4D:
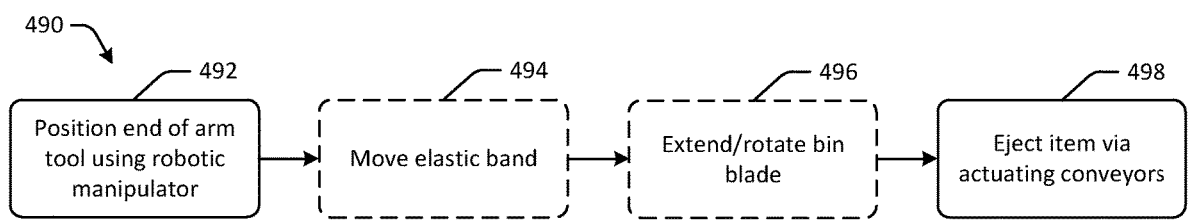

In FIG. 4D, an example process flow 490 is depicted for placing an item into a container. The end of arm tool 400 may include a controller that may be onboard or remote. The controller may be configured to cause an item to be grasped between the first conveyor assembly 450 and the second conveyor assembly 460. The controller may cause actuation of the first conveyor assembly 450 and the second conveyor assembly 460 to unload the item from the item manipulation device or end of arm tool 400. The end of arm tool 400 may include one or more sensors for obtaining data associated with the item, such as at least one of an optical sensor, a camera, a force sensor, a weight sensor, and/or another type of sensor.

At block 492, the end of arm tool 400 may be positioned in an appropriate location, such as in front of a stowage pod, using the robotic manipulator 480. At optional block 494, an elastic band, fabric band, or other type of securing device may be manipulated, such as moved, to provide access to a storage area. The securing device may be moved by a hook or other component of the end of arm tool 400 and/or a component coupled to the robotic manipulator. At optional block 496, the bin blade 470 of the end of arm tool 400 may be extended and/or rotated (e.g., to flip up a fallen book, etc.) to create space in the storage space. At block 498, the item may be ejected from the end of arm tool 400 via actuation of the first conveyor assembly 450 and the second conveyor assembly 460.

Accordingly, a system may include a robotic manipulator, and an item manipulation device, such as the end of arm tool 400, coupled to the robotic manipulator. The item manipulation device may include a first conveyor assembly having a first conveyance surface configured to actuate in a first direction, and a second conveyor assembly having a second conveyance surface that opposes the first conveyance surface, the second conveyance surface configured to actuate in the first direction, where the item manipulation device is configured to grasp an item between the first conveyor assembly and the second conveyor assembly. The item manipulation device may include a sensor configured to detect presence of the item between the first conveyor assembly and the second conveyor assembly, where the item manipulation device is configured to rotate 360 degrees with respect to the robotic manipulator. The item manipulation device may include a bin blade disposed adjacent to the first conveyor assembly, where the bin blade is disposed on a plane parallel to the first conveyance surface, and a motor configured to cause the bin blade to extend and retract, where the bin blade is configured to extend adjacent to the first conveyor assembly in an extended position, and configured to be substantially aligned with the first conveyor assembly in a retracted position. The second conveyor assembly may be configured to slide towards and away from the first conveyor assembly. The system may include a controller configured to cause the second conveyor assembly to slide towards the first conveyor assembly, such as via one or more actuators, determine that the item is grasped between the first conveyor assembly and the second conveyor assembly, cause the item manipulation device to move adjacent to a storage bin, cause the blade to extend into the storage bin, and cause the first conveyor assembly and the second conveyor assembly to actuate to unload the item from the item manipulation device into the storage bin.

Figure 5A:
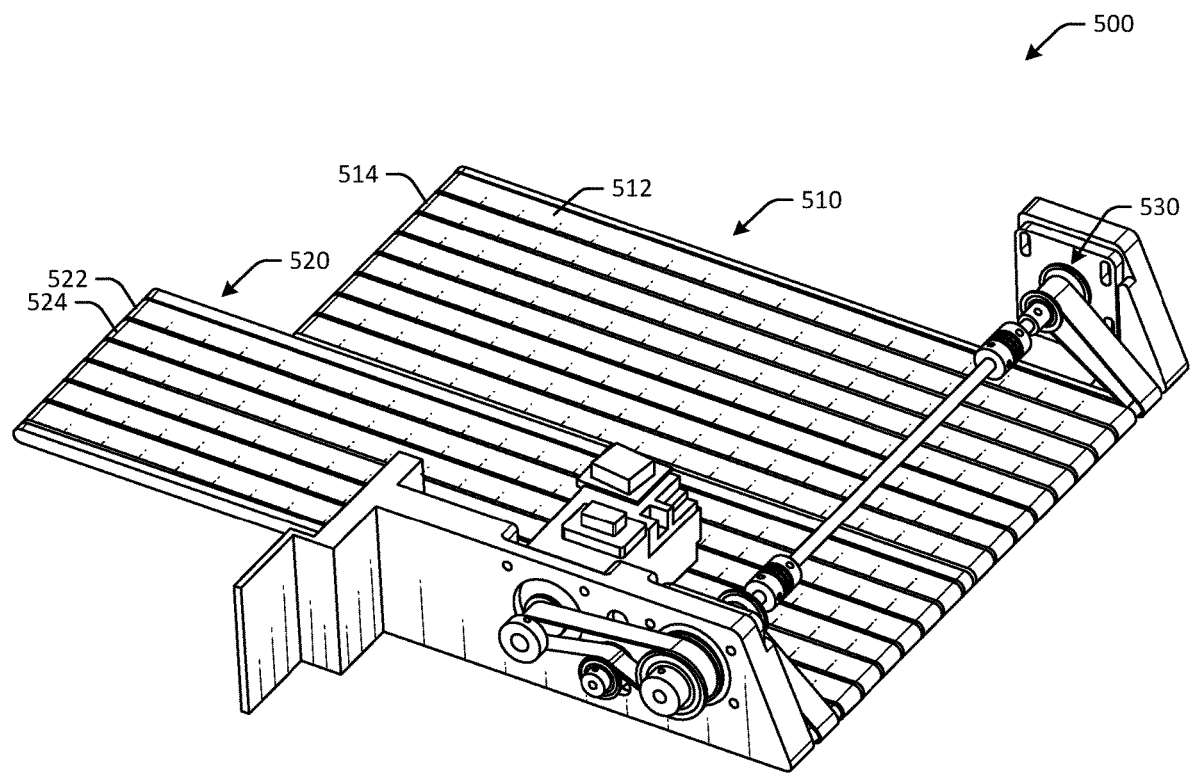
FIGS. 5A-5B are schematic illustrations of an end of arm tool having conveyance surfaces in accordance with one or more embodiments of the disclosure.
Figure 5B:
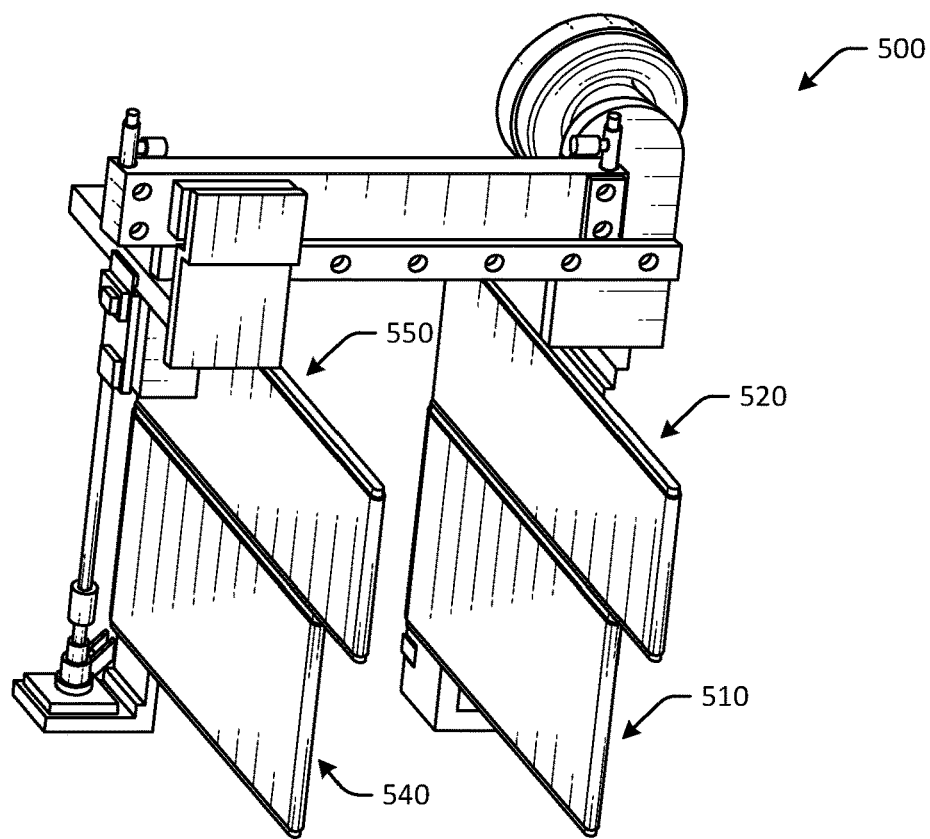
Figure 5B:
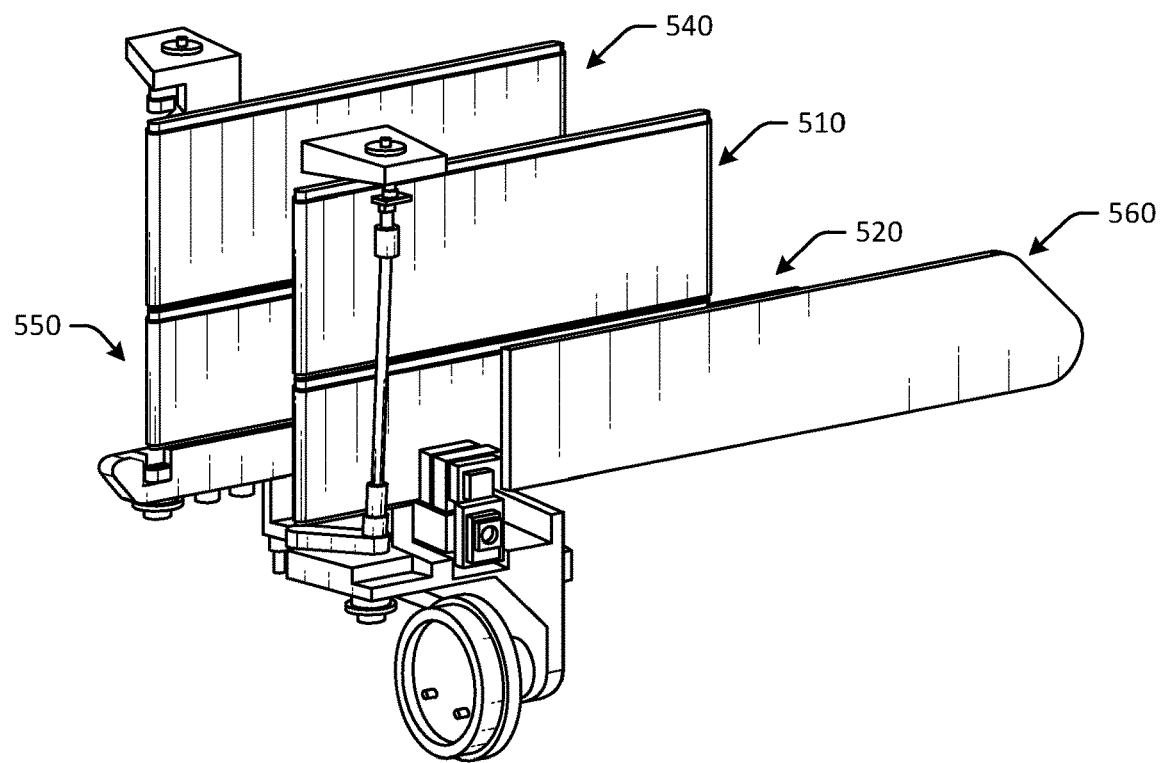

FIGS. 5A-5B are schematic illustrations of an end of arm tool having conveyance surfaces in accordance with one or more embodiments of the disclosure. Other embodiments may include additional or fewer components. The illustrations of FIGS. 5A-5B are not to scale, and may not be illustrated to scale with respect to other figures. The item manipulation device illustrated in FIGS. 5A-5B may be the item manipulation device and/or may be used with the systems discussed with respect to FIGS. 1-3.

In FIG. 5A, an alternate embodiment of an item manipulation device 500 is depicted. The item manipulation device 500 may include a first paddle or first side that has a first conveyor assembly 510 having a first length and a second conveyor assembly 520 having a second length that is greater than the first length. As depicted in FIG. 5B, the item manipulation device 500 may include a second paddle including a third conveyor assembly 540 and a fourth conveyor assembly 550, where the third conveyor assembly 540 has a shorter length than the fourth conveyor assembly 550. One or more bin blades 560 may be coupled to the respective paddles. For example, the bin blade 560 may be disposed adjacent to the second conveyor assembly 520 and may extend and retract relative to a frame of the item manipulation device 500.

The first conveyor assembly 510 may include one or more conveyance surfaces. For example, the first conveyor assembly 510 may include a first conveyor belt 512, a second conveyor belt 514, and so forth. Similarly, the second conveyor assembly 520 may include a third conveyor belt 522, a fourth conveyor belt 524, and so forth. Any number of conveyors or conveyance surfaces may be used. Such individual conveyors may provide additional control over item movement and control during ejection of items.

The item manipulation device 500 may include one or more actuators, such as motors 530 configured to drive the individual conveyors and/or conveyor assemblies. In some embodiments, conveyors may be driven individually, whereas in other embodiments, conveyors may be driven in groups simultaneously.

The item manipulation device 500 may therefore have a first conveyor assembly with a first length, and a second conveyor assembly disposed in a coplanar arrangement relative to the first conveyor assembly, where the second conveyor assembly has a second length that is less than the first length. The second conveyor assembly may be configured to be actuated independent of the first conveyor assembly.

Similarly, the item manipulation device 500 may include a third conveyor assembly with the first length, and a fourth conveyor assembly disposed in a coplanar arrangement relative to the third conveyor assembly, the fourth conveyor assembly having the second length. The fourth conveyor assembly may be configured to be actuated independent of the third conveyor assembly. One or more of the conveyance assemblies may include a plurality of conveyor belts, as depicted in FIG. 5A. Other embodiments may include singular conveyance surfaces, as depicted in FIG. 5B. In some embodiments, the opposing conveyor assemblies may be opened and closed separately (e.g., the lower conveyor assemblies can be actuated towards each other independent of the upper conveyor assemblies, etc.).

To load items, the end of arm tool 400 may be positioned to receive the item, and the conveyor assemblies may be moved closer together to clamp the item. In some embodiments, the conveyor assemblies may be actuated to further secure an item and/or to move the item further rearward into the end of arm tool 400. To unload items, the conveyors may be actuated and/or the conveyor assemblies may be separated to release a grip on the item.

One or more operations of the methods, process flows, or use cases of FIGS. 1-5B may have been described above as being performed by a user device, or more specifically, by one or more program module(s), applications, or the like executing on a device. It should be appreciated, however, that any of the operations of the methods, process flows, or use cases of FIGS. 1-5B may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-5B may be described in the context of the illustrative devices, it should be appreciated that such operations may be implemented in connection with numerous other device configurations.

The operations described and depicted in the illustrative methods, process flows, and use cases of FIGS. 1-5B may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-5B may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 6:
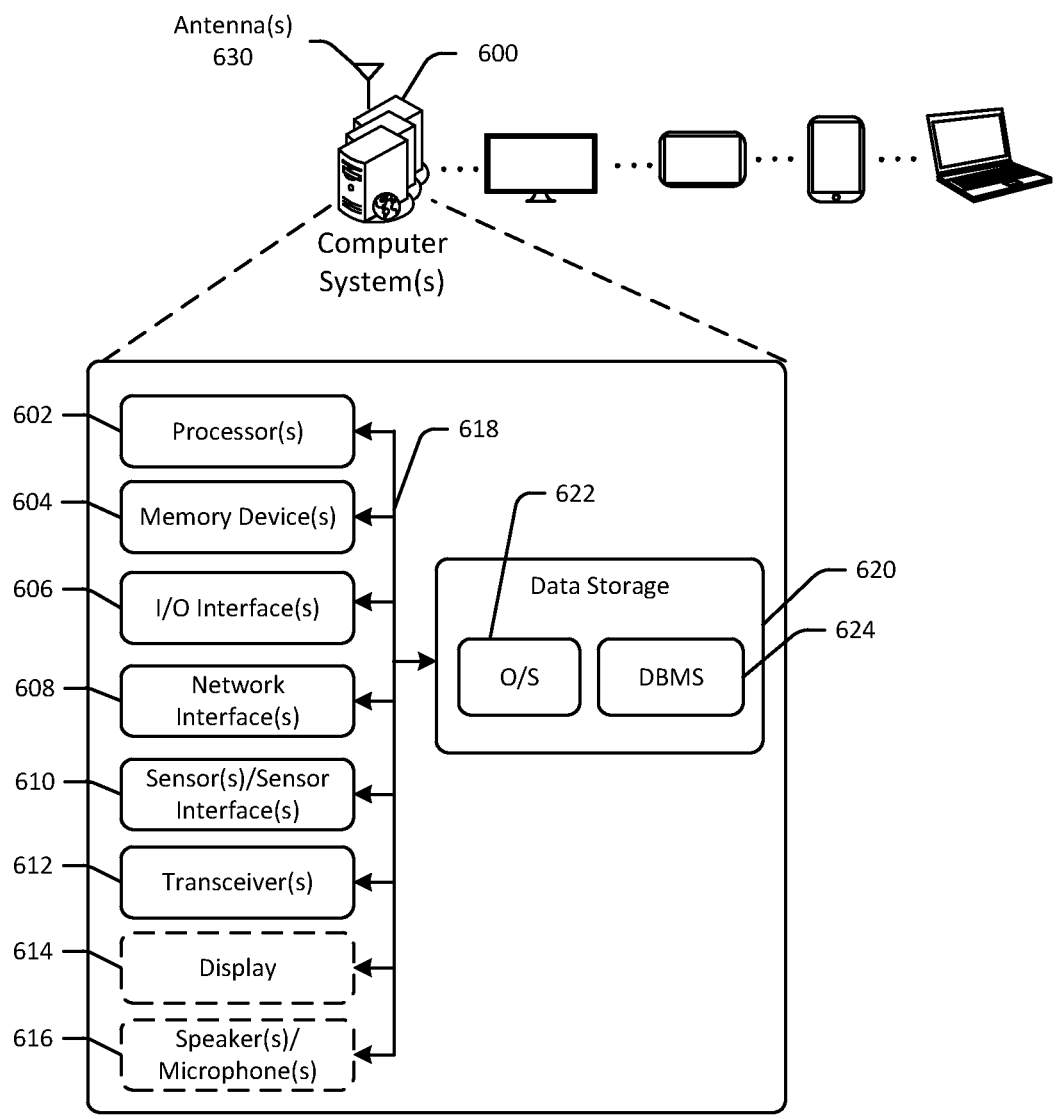
FIG. 6 schematically illustrates an example architecture of a computer system associated with an end of arm tool in accordance with one or more embodiments of the disclosure.

FIG. 6 is a schematic block diagram of one or more illustrative computer system(s) 600 in accordance with one or more example embodiments of the disclosure. The computer system(s) 600 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 600 may correspond to an illustrative device configuration for the device(s) of FIGS. 1-5B. For example, the computer system(s) 600 may control one or more aspects of the robotic manipulators and/or end of arm tools described in FIGS. 1-5B, such as determining whether items are grasped, determining end of arm tool positioning, determining when and what distance to extend bin blades, determine when and how long to actuate conveyance surfaces, and so forth.

The computer system(s) 600 may be configured to communicate with one or more servers, user devices, cameras, or the like. The computer system(s) 600 may be configured to identify items, retrieve items or containers, move items or containers, and so forth.

The computer system(s) 600 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 600 may include one or more processors (processor(s)) 602, one or more memory devices 604 (also referred to herein as memory 604), one or more input/output (I/O) interface(s) 606, one or more network interface(s) 608, one or more sensor(s) or sensor interface(s) 610, one or more transceiver(s) 612, one or more optional display(s) 614, one or more optional microphone(s) 616, and data storage 620. The computer system(s) 600 may further include one or more bus(es) 618 that functionally couple various components of the computer system(s) 600. The computer system(s) 600 may further include one or more antenna(s) 630 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 618 may include at least one of a system bus, a memory bus, an address bus, or a message bus, and may permit the exchange of information (e.g., data (including computer-executable code), signaling, etc.) between various components of the computer system(s) 600. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 604 of the computer system(s) 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to the memory 604 for use by the processor(s) 602 during the execution of the computer-executable instructions. Moreover, output data generated as a result of execution of the computer-executable instructions by the processor(s) 602 may be stored initially in the memory 604, and may ultimately be copied to the data storage 620 for non-volatile storage.

More specifically, the data storage 620 may store one or more operating systems (O/S) 622; one or more database management systems (DBMS) 624; and one or more program module(s), applications, engines, computer-executable code, scripts, or the like. Some or all of these module(s) may be sub-module(s). Any of the components depicted as being stored in the data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in the data storage 620 may support functionality described in reference to corresponding components named earlier in this disclosure.

The data storage 620 may further store various types of data utilized by the components of the computer system(s) 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 602 may be configured to access the memory 604 and execute the computer-executable instructions loaded therein. For example, the processor(s) 602 may be configured to execute the computer-executable instructions of the various program module(s), applications, engines, or the like of the computer system(s) 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to other illustrative components depicted as being stored in the data storage 620, the O/S 622 may be loaded from the data storage 620 into the memory 604 and may provide an interface between other application software executing on the computer system(s) 600 and the hardware resources of the computer system(s) 600. More specifically, the O/S 622 may include a set of computer-executable instructions for managing the hardware resources of the computer system(s) 600 and for providing common services to other application programs (e.g., managing memory allocation among various application programs). In certain example embodiments, the O/S 622 may control execution of the other program module(s). The O/S 622 may include any operating system now known or which may be developed in the future including, but not limited to, any server operating system, any mainframe operating system, or any other proprietary or non-proprietary operating system.

The DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 600 is a mobile device, the DBMS 624 may be any suitable lightweight DBMS optimized for performance on a mobile device.

Referring now to other illustrative components of the computer system(s) 600, the input/output (I/O) interface(s) 606 may facilitate the receipt of input information by the computer system(s) 600 from one or more I/O devices as well as the output of information from the computer system(s) 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna(s) 630 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 600 may further include one or more network interface(s) 608 via which the computer system(s) 600 may communicate with any of a variety of other systems, platforms, networks, devices, and so forth. The network interface(s) 608 may enable communication, for example, with one or more wireless routers, one or more host servers, one or more web servers, and the like via one or more networks.

The antenna(s) 630 may include any suitable type of antenna depending, for example, on the communications protocols used to transmit or receive signals via the antenna(s) 630. Non-limiting examples of suitable antennas may include directional antennas, non-directional antennas, dipole antennas, folded dipole antennas, patch antennas, multiple-input multiple-output (MIMO) antennas, or the like. The antenna(s) 630 may be communicatively coupled to one or more transceivers 612 or radio components to which or from which signals may be transmitted or received.

As previously described, the antenna(s) 630 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 630 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 630 may be configured to transmit or receive radio frequency signals within any suitable frequency range forming part of the unlicensed portion of the radio spectrum.

The antenna(s) 630 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(s) 630—transmitting or receiving radio frequency (RF) signals in the bandwidth and/or channels corresponding to the communications protocols utilized by the computer system(s) 600 to communicate with other devices. The transceiver(s) 612 may include hardware, software, and/or firmware for modulating, transmitting, or receiving—potentially in cooperation with any of antenna(s) 630—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the computer system(s) 600. The transceiver(s) 612 may further include a low noise amplifier (LNA), additional signal amplifiers, an analog-to-digital (A/D) converter, one or more buffers, a digital baseband, or the like.

The sensor(s)/sensor interface(s) 610 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 614 may be configured to output light and/or render content. The optional speaker(s)/microphone(s) 616 may be any device configured to receive analog sound input or voice data.

It should be appreciated that the program module(s), applications, computer-executable instructions, code, or the like depicted in FIG. 6 as being stored in the data storage 620 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 600, and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the computer system(s) 600 may include alternate and/or additional hardware, software, or firmware components beyond those described or depicted without departing from the scope of the disclosure. More particularly, it should be appreciated that software, firmware, or hardware components depicted as forming part of the computer system(s) 600 are merely illustrative and that some components may not be present or additional components may be provided in various embodiments. While various illustrative program module(s) have been depicted and described as software module(s) stored in the data storage 620, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system comprising:
  a robotic manipulator; and
  an item manipulation device coupled to the robotic manipulator, the item manipulation device comprising:
    a first conveyor assembly having a first conveyance surface configured to actuate in a first direction;
    a second conveyor assembly having a second conveyance surface that opposes the first conveyance surface, the second conveyance surface configured to actuate in the first direction, wherein the item manipulation device is configured to grasp an item between the first conveyor assembly and the second conveyor assembly; and
    a controller configured to detect presence of the item between the first conveyor assembly and the second conveyor assembly.

2. The system of claim 1, wherein the item manipulation device further comprises:
  a bin blade disposed adjacent to the first conveyor assembly, wherein the bin blade is disposed on a plane parallel to the first conveyance surface; and
  an actuator configured to cause the bin blade to extend and retract;
  wherein the bin blade is configured to extend adjacent to the first conveyor assembly in an extended position, and configured to be substantially aligned with the first conveyor assembly in a retracted position.

3. The system of claim 1, wherein the second conveyor assembly is configured to slide towards and away from the first conveyor assembly, wherein the controller is further configured to:
  cause the second conveyor assembly to slide towards the first conveyor assembly;

cause the first conveyor assembly and the second conveyor assembly to actuate to load the item into the item manipulation device;
determine that the item is grasped between the first conveyor assembly and the second conveyor assembly;
cause the item manipulation device to move adjacent to a storage bin;
cause the blade to extend into the storage bin; and
cause the first conveyor assembly and the second conveyor assembly to actuate to unload the item from the item manipulation device into the storage bin.

4. The system of claim 3, wherein the first conveyor assembly is configured to slide towards and away from the second conveyor assembly.

5. An item manipulation device comprising:
a first conveyor assembly having a first conveyance surface configured to actuate in a first direction;
a second conveyor assembly having a second conveyance surface that opposes the first conveyance surface, the second conveyance surface configured to actuate in the first direction, wherein the item manipulation device is configured to grasp an item between the first conveyor assembly and the second conveyor assembly; and
a controller configured to:
cause the item to be grasped between the first conveyor assembly and the second conveyor assembly; and
actuate the first conveyor assembly and the second conveyor assembly to unload the item from the item manipulation device.

6. The item manipulation device of claim 5, further comprising:
a first bin blade disposed adjacent to the first conveyor assembly, the first bin blade configured to move from a retracted position to an extended position relative to the first conveyor assembly.

7. The item manipulation device of claim 6, further comprising:
a second bin blade disposed adjacent to the second conveyor assembly, the second bin blade configured to move from the retracted position to the extended position relative to the second conveyor assembly.

8. The item manipulation device of claim 5, wherein the first conveyor assembly has a first length, the item manipulation device further comprising:
a third conveyor assembly disposed in a coplanar arrangement relative to the first conveyor assembly, the third conveyor assembly having a second length that is less than the first length;
wherein the third conveyor assembly is configured to be actuated independent of the first conveyor assembly.

9. The item manipulation device of claim 8, wherein the second conveyor assembly has the first length, the item manipulation device further comprising:
a fourth conveyor assembly disposed in a coplanar arrangement relative to the second conveyor assembly, the fourth conveyor assembly having the second length;
wherein the fourth conveyor assembly is configured to be actuated independent of the second conveyor assembly.

10. The item manipulation device of claim 5, wherein the first conveyance surface and the second conveyance surface are configured to actuate in a second direction opposite the first direction.

11. The item manipulation device of claim 5, wherein the first conveyor assembly comprises a plurality of conveyor belts.

12. The item manipulation device of claim 5, further comprising:
a first actuator configured to cause the second conveyor assembly to move towards the first conveyor assembly.

13. The item manipulation device of claim 12, wherein the first actuator is further configured to cause the first conveyor assembly to move towards the second conveyor assembly.

14. The item manipulation device of claim 5, further comprising:
one or more sensors for obtaining data associated with the item, the one or more sensors comprising at least one of: an optical sensor, a camera, a force sensor, or a weight sensor.

15. The item manipulation device of claim 5, wherein the item manipulation device is coupled to a robotic manipulator via a mating quick-attachment connector, and wherein the item manipulation device is configured to rotate at least 90 degrees with respect to the robotic manipulator.

16. A robotic system comprising:
a robotic manipulator; and
an item manipulation device comprising:
a first conveyor assembly having a first conveyance surface configured to actuate in a first direction;
a second conveyor assembly having a second conveyance surface that opposes the first conveyance surface, the second conveyance surface configured to actuate in the first direction, wherein the item manipulation device is configured to grasp an item between the first conveyor assembly and the second conveyor assembly; and
a controller configured to:
cause the item to be grasped between the first conveyor assembly and the second conveyor assembly; and
actuate the first conveyor assembly and the second conveyor assembly to unload the item from the item manipulation device.

17. The robotic system of claim 16, further comprising:
a first bin blade disposed adjacent to the first conveyor assembly, the first bin blade configured to move from a retracted position to an extended position relative to the first conveyor assembly.

18. The robotic system of claim 16, wherein the first conveyor assembly has a first length, the item manipulation device further comprising:
a third conveyor assembly disposed in a coplanar arrangement relative to the first conveyor assembly, the third conveyor assembly having a second length that is less than the first length;
wherein the third conveyor assembly is configured to be actuated independent of the first conveyor assembly.

19. The robotic system of claim 16, wherein the first conveyance surface comprises a plurality of conveyor belts.

20. The robotic system of claim 16, further comprising:
a first actuator configured to cause the second conveyor assembly to move towards the first conveyor assembly.

* * * * *